United States Patent [19]

Van Pelt

[11] Patent Number: 4,494,711
[45] Date of Patent: Jan. 22, 1985

[54] DUAL MODE CONTROL SYSTEM FOR CONTROLLING TAPE POSITION IN A REEL TO REEL TRANSPORT APPARATUS

[75] Inventor: Richard Van Pelt, Boulder, Colo.

[73] Assignee: Storage Technology Corporation, Louisville, Colo.

[21] Appl. No.: 462,492

[22] Filed: Jan. 31, 1983

[51] Int. Cl.³ .................... G11B 15/06; G11B 23/12
[52] U.S. Cl. ........................................ 242/184; 360/73
[58] Field of Search ................................ 242/182–185; 226/118; 318/6, 7, 590, 592, 661; 360/71, 73, 90

[56] References Cited

U.S. PATENT DOCUMENTS

| | | | |
|---|---|---|---|
| 3,433,426 | 3/1969 | Brown et al. | 242/184 |
| 3,462,659 | 8/1969 | Lee | 318/6 |
| 3,563,492 | 2/1971 | Ferrier, Jr. | 242/184 |
| 3,648,134 | 3/1972 | Audeh et al. | 318/6 |
| 3,733,275 | 11/1973 | Coppa et al. | 242/184 |
| 3,916,441 | 10/1975 | Jones | 360/90 |
| 4,221,998 | 9/1980 | Haught et al. | 318/661 |

FOREIGN PATENT DOCUMENTS

| | | | |
|---|---|---|---|
| 69604 | 6/1977 | Japan | 242/184 |
| 147817 | 11/1979 | Japan | 242/184 |
| 25879 | 2/1980 | Japan | 242/184 |

*Primary Examiner*—Leonard D. Christian
*Attorney, Agent, or Firm*—Bryant R. Gold

[57] ABSTRACT

A control system for controlling the position of tape in a reel to reel tape transport system which includes a loop position responsive generator for generating loop reference signals representing a desired tape position in associated buffers; transducing means for measuring the position of tape loops in the buffers; a plurality of current generators for producing an output signal in response to one of the reference signals and the desired position signal; selector means for selecting an output control signal from one of the current generators selected control signal, and amplifying means for applying current to the reel drive motor. A constant current control mode is used when the tape position error is large, and a linear position control is used when the tape position error is small. Control is switched between the two modes as required for achieving the desired control while using minimal power. The system handles the worst case capstan reversal with a minimum turnaround time. Tape position is sampled at a rate that is a multiple of the mechanical resonance of the tape in the buffers thereby minimizing the effect of the resonance on the measurement. The system further uses a feedforward signal generator during the initial stage of motor control to compensate for the lag in the position transducer means.

16 Claims, 13 Drawing Figures

DUAL MODE CONTROL SYSTEM FOR CONTROLLING TAPE POSITION IN A REEL TO REEL TRANSPORT APPARATUS

BACKGROUND OF THE INVENTION

This invention relates to reel-to-reel magnetic tape systems. More particularly, the invention relates to a two mode control system for controlling the amount of tape in the buffers of a reel-to-reel tape system that uses a minimum amount of power, does not cause the tape to overshoot its final position, and that can handle a worst case capstan reversal with a minimal turnaround delay.

A reel-to-reel magnetic tape system has two reels, a file reel and a machine reel. The file reel has a continuous length of tape wound on it from which the magnetic tape system may read data or on which the magnetic tape system may write data. The tape on the file reel is threaded through a path that carries the tape past a set of read/write heads to the machine reel. The machine reel stores the tape from the file reel after it has passed the read/write heads. Tape may be rewound from the machine reel back onto the file reel.

A capstan roller, driven by a capstan motor (the combination of capstan roller and capstan motor will hereafter be called the capstan), is typically used to drive the magnetic tape past the read/write heads. As the capstan moves the tape past the read/write heads, the file and machine reels must turn, one to supply and the other to store it.

A capstan accelerates to its final velocity in a time that is very short compared to the time it takes the reel motors to start moving the reels. Therefore, buffers are provided in the tape path that supply the tape on one side of the capstan and store it on the other side until the reel motors can get their respective reels up to speed.

There are two types of buffer systems commonly used on reel-to-reel magnetic tape systems: (1) vacuum columns, and (2) tension arms (also called swing arms). Both types use servo systems to control the position of the tape in the buffers. The theory and operation of tape buffers is well understood in the art and will not be discussed herein.

In the prior art, two types of servo systems are commonly used to control the movement of tape from one reel to the other, including controlling the position of the tape in the tape buffer. In a first, a linear position controller provies a correction current to the reel motor that is proportional to the position error of the tape within the tape buffer and to the velocity of the tape. In a second, a "bang-bang" controller provides a current pulse to the reel motor in a drive-coast-brake sequence, a current pulse of one polarity serving to drive the motor in one direction, and a current pulse of the opposite polarity serving to brake or stop the motor once driven.

Unfortunately, both the linear position and "bang-bang" servo controllers have disadvantages. The linear position controller cannot respond to the worst case capstan reversal wherein the capsan, while driving the tape in one direction, is reversed without a pause. When this happens, the linear position controller must hold off the reversal, i.e., introduce a pause, while the servo adjusts the amount of tape in the buffers. This results in a degradation in system performance.

The "bang-bang" controller is wasteful of power since it is continually accelerating and decelerating the reel motor. The "bang-bang" controller may or may not be able to handle the worst case reversal without causing a degradation in performance, depending upon the tape speed at the time the reversal occurs; but in those cases where a reversal can be handled, the tape will often overshoot its final position. This also wastes power as the overshoot must be brought under control.

SUMMARY OF THE INVENTION

It is an object of the present invention to provide an improved control system for a reel-to-reel tape system.

It is a further object of the present invention to provide a reel-to-reel control system that operates in one of two modes, a first mode to provide optimum acceleration or deceleration, and a second mode to provide optimum linear position control.

It is another object of the present invention to provide such a reel-to-reel control system that uses a minimum amount of power, does not cause the tape to overshoot its final position, and can handle a worst case capstan reversal with little, if any delay.

The above and other objects of the present invention are realized by providing a nonlinear mode of control for large tape position error and a linear mode of control for small tape position error. Each mode uses a position reference generator that generates a desired position reference signal for comparison with a signal representing the actual, measured position of the tape. As in conventional servo systems, the difference between the reference signal and the measured signal becomes an error signal that is used to drive the file or machine reel motor in a direction that reduces the error. Unlike conventional servo systems, however, the generated position reference signal changes at an exponential rate so as to minimize the initial current to the motor, thereby saving power. Further, in order to compensate for delays associated with the operation of a conventional position transducer (used to generate the signal representing the actual, measured position of the tape), the present invention utilizes a unique feed forward signal that adds a small correction to the measured tape loop speed immediately after a change in capstan motion. This effectively speeds up the initial movement of the tape. Moreover, the present invention masks the effect of mechanical resonance on the tape position through a unique method that samples the tape position measurement. Also, a method is used to minimize the turnaround delay associated with a worst case capstan reversal by determining how long the capstan must be delayed as a function of the relative positions of the tape in the tape buffers.

In a preferred embodiment of the invention, the above features are realized through the use of a microprocessor, although any equivalent apparatus or combination of apparatus could likewise be used.

BRIEF DESCRIPTION OF THE DRAWINGS

The above and other objects, features, and advantages of the present invention will become more apparent from the following more particular description thereof, presented in conjunction with the following drawings, wherein.

DESCRIPTION OF THE PREFERRED EMBODIMENT

The following is a description of the best presently contemplated mode of carrying out the present invention. This description is given only to illustrate the objectives, advantages, and features of the invention and is not to be taken in a limiting sense. The true scope of the invention can be ascertained by referring to the appended claims.

As explained previously, two types of tape buffers are commonly used in reel-to-reel tape systems: (1) vacuum columns, and (2) tension arms (or swing arms). However, the principles involved are the same for both types. Therefore, the description which follows is, for simplicity of explanation, limited to an embodiment which uses vacuum columns as the buffer for storing tape. It is to be understood, however, that the present invention could be used with any type of tape buffer system.

Figure 1:
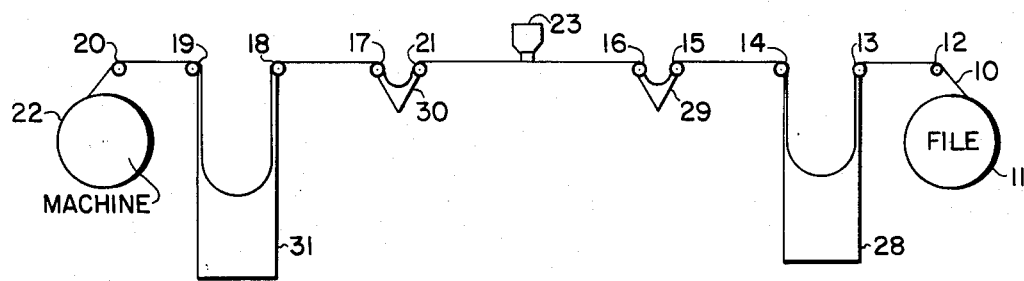
FIG. 1 is a schematic representation of a typical tape path of a reel-to-reel magnetic tape system.

FIG. 1 is a schematic representation of a typical tape path on a reel-to-reel magnetic tape system wherein vacuum columns are used for the tape buffers. Magnetic tape 10 travels from the file reel 11 to the machine reel 22 over and around a multiplicity of rollers and idlers, 12-20. In the approximate center of the path are read/write heads 23 and a capstan 21. A length of tape is stored in a file column 28 and in a machine column 31. Also shown are two "stubby" columns 29 and 30, one on either side of the capstan 21. These columns are passive, that is, the amount of tape in them is not measured, and they serve as a source of tape during the initial, almost instantaneous, acceleration and deceleration of the capstan 21.

FIGS. 2, 3 and 4 are schematic representations that show the position of the magnetic tape in the buffer columns for various cycles of operation for magnetic tape systems that use the preferred embodiment of the invention. For simplicity, only the buffer 28 and 31 and the tape 10 are shown in these figures.

FIG. 2 shows the positions of the magnetic tape in the columns 28 and 31 for a slow speed magnetic tape system. (The cross over point between a slow speed system and a high speed system is relative and depends upon a number of factors, not important to the present invention, and therefore not defined in this description.)

Figure 2A:
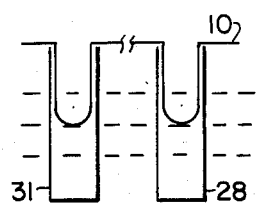
FIGS. 2a, 2b, and 2c are likewise schematic representations indicating the position of the tape in the vacuum columns of a slow speed tape system when the tape is at rest, moving forward, and moving in reverse, respectively.
Figure 2B:
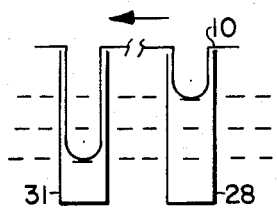
Figure 2C:
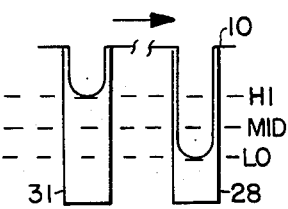

FIG. 2a shows the tape position in the buffer columns 28 and 31 when the tape is at rest. The tape is at the MID point in both the file column 28 and the machine column 31. FIG. 2b shows the tape position when the capstan is moving the tape in the forward direction (from the file reel 11 to the machine reel 22 in FIG. 1). The servo system maintains the tape in the file buffer 28 at the HI point and the tape in machine buffer 31 at the LO point. FIG. 2c shows the tape position when the capstan is moving the tape in the reverse direction. During a reverse operation, the servo system maintains the tape in the file buffer 28 at the LO point and the tape in the machine buffer 31 at the HI point.

Assuming the tape is initially at rest (FIG. 2a), tape will be pulled from one column and fed to the other when the capstan starts. The tape may or may not exceed the HI and LO points shown in FIGS. 2b and 2c, depending upon the speed, but the servo system is designed to respond in time to prevent the tape from being pulled completely out of the buffer column from which it is being fed, or from filling the buffer column to which it is being fed. Unfortunately, in prior art systems, this servo response may cause tape position overshoot, with the attendant risk that the buffer column limits might be exceeded. As will be explained hereafter, this is not a risk with the present invention. When the capstan stops, the reel motors are decelerated to return the tape to the rest position shown in FIG. 2a.

The present invention, by using two modes of control, can advantageously handle a worst case capstan reversal on a slow speed system without any degradation in performance. That is, if the capstan is moving tape in the forward direction and the tape positions are as shown in FIG. 2b when a capstan reversal occurs, the capstan will begin pulling tape from the machine column 31 and feeding it to the file column 28. The machine reel 22, which cannot reverse as quickly as the capstan 21 (FIG. 1), and which was pulling tape from the machine column 31 prior to reversal, will continue to do so after reversal as it is decelerated by the servo system. Similarly, the file reel 11, which was feeding tape into the file column 28 prior to reversal, will continue to feed the file column 28 as it is decelerated by the servo system. However, the servo system of the present invention, as explained below, advantageously stops the reel motors and changes their direction before the machine column 31 empties or before the file column 28 fills. This reversal is accomplished without any delays, and without undesirable tape overshoot, and with minimum power consumption.

Figure 3A:
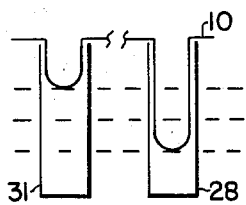
FIGS. 3a and 3b are also schematic representations of the tape in the vacuum columns of a high speed tape system, showing the tape at rest when the last tape motion was in the forward direction, and when moving forward, respectively.
Figure 3B:
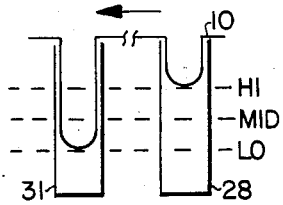

FIGS. 3 and 4 depict the tape positions in the buffer columns of a high speed tape system, e.g., 200 inches per second. The invention assumes that the next capstan movement will be in the same direction as the previous capstan movement. In general, this assumption is true. FIG. 3a shows the tape position when at rest when the last capstan movement was in the forward direction, while FIG. 3b shows the position of the tape when the capstan is moving tape in the forward direction.

Figure 4A:
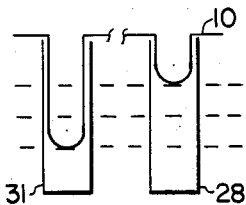
FIGS. 4a and 4b are the same as FIGS. 3a and 3b except the positions shown are the tape at rest when the last tape motion was in the reverse direction, and when moving in reverse, respectively.
Figure 4B:
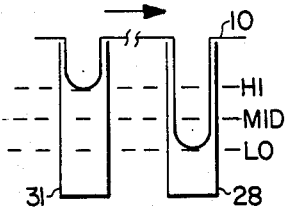

FIGS. 4a and 4b are similar to FIGS. 3a and 3b except the "at rest" tape position shown in FIG. 4a is for when the last capstan movement was in the reverse direction, and FIG. 4b shows the tape position when the capstan is moving tape in the reverse direction.

The control system of the present invention, by anticipating that the next movement will be in the same direction as the previous movement, adjusts the position of the tape in the buffer columns at the completion of a movement such that the buffer column to have tape pulled therefrom will have an excess of tape, while the buffer column to have tape fed therein will have a minimum amount of tape. Since the assumption is correct most of the time, capstan movement can be started immediately with no delays. In those few instances when the assumption is wrong, the capstan movement is delayed while the servo adjusts the tape positions in the columns. Although this results is in a slight delay when it occurs, the average performance of the high speed magnetic tape system is hardly affected.

Advantageously, by assuming that the next capstan movement will be in the same direction as the previous capstan movement, power is also saved. Less braking current need be delivered to the reel motors to stop the tape at the positions shown in FIGS. 3a and 4a, for forward and backward motion, respectively, than would otherwise be required to stop the tape at the positions shown in FIG. 2a. Further, since in general the tape is at the correct positions in the buffer columns for the next movement, no additional power is required to adjust the tape for the next movement, as it would be if it were stopped at the positions shown in FIG. 2a.

Figure 5:
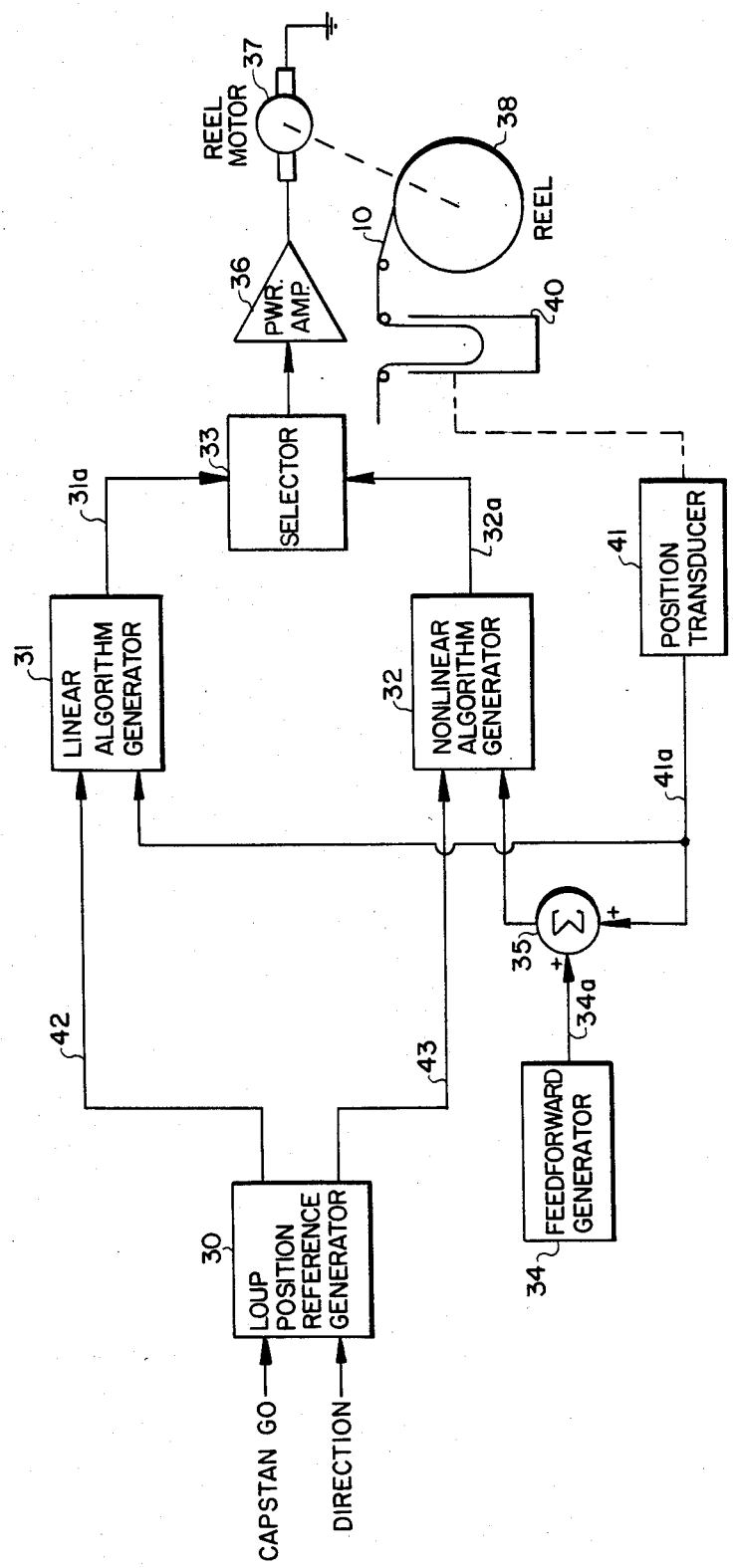
FIG. 5 is a block diagram of the present invention.

FIG. 5 is a block diagram of the present invention. Shown in FIG. 5 is the control system for a reel motor 37 of a magnetic tape system. A similar block diagram could be drawn for the other reel motor. The reel motor 37 is mechanically coupled to the reel 38 which supplies or takes up the tape 10 to or from a buffer vacuum column 40. The reel 38 of FIG. 5 could be either the file reel 11 or the machine reel 22 of FIG. 1, while the buffer column 40 of FIG. 5 could be either the file column 28 or the machine column 31 of FIG. 1.

Spaced along the length of column 40 are a multiplicity of holes. As the tape 10 moves up and down the column 40 it covers or uncovers these holes. The holes are connected to a vacuum plenum whose pressure is converted by the transducer 41 to an electrical signal 41a indicative of the position of the tape 10 in the column 40. Other known types of position sensors could be used in combination with a suitable position transducer 41 to produce an equivalent position signal 41a for use with either vacuum buffer columns or other types of tape buffer systems (such as a tension arm system).

A loop position reference generator 30 has two inputs, CAPSTAN GO, a binary signal which is true when the capstan is moving, and DIRECTION, a binary signal which is true when the movement is in the forward direction. The loop position reference generator 30 generates two reference signals 42 and 43, each reference signal being generated at a different exponential rate. The reason for using a reference signal having an exponential rate is explained below. The reference signals represent the desired position of the tape in the column, and the final values of both of the reference signals, 42 and 43, are the same.

The first reference signal 42, having a long time constant associated therewith, is an input to a linear algorithm generator 31. The second reference signal 43, having a short time constant associated therewith, is an input to the nonlinear algorithm generator 32. The generator 31 also utilizes the output of the position transducer 41 as another input thereto. A summing network 35 adds the output 41a of the position transducer 41 to the output 34a of a feed forward generator 34. The output of the summing network 35 serves as a second input to the nonlinear algorithm generator 32. The generators 31 and 32 sample their inputs at predetermined times. The two inputs to each generator represent the present desired position and the present actual position of the tape 10 in the column 40. Based upon these inputs, the generators 31 and 32 calculate and generate current command signals 31a and 32a, respectively, for controlling the amount of current delivered to the reel motor 37.

A selector 33 decides which signal 31a or 32a to use and supplies that output to the power amplifier 36. The amplifier 36 converts the selected signal to a current and applies it to the reel motor 37 to correct the position of the tape 10 in the column 40.

In the preferred embodiment, the loop position reference generator 30, linear algorithm generator 31, nonlinear algorithm generator 32, selector 33, feed forward generator 34, and summing network 35 may advantageously be realized as part of a microprocessor. This microprocessor could be of any type, such as a Z80 type microprocessor manufactured by Zilog, Mostek, and other manufacturers, which microprocessor could also be used to control many of the other functions of the reel-to-reel type systems, such as is done in the 2920 Tape System manufactured by Storage Technology Corporation. Alternatively, each of these elements 30–35 could be realized as discrete components of the overall tape system.

The algorithm used by the nonlinear algorithm generator to determine the current required for the reel motor 37 may be described as indicated below in Equation (1):

$$I_i = K_1 \frac{(Y_i + FF_i - Y_{i-n})^2}{(YREF_i - Y_i)} \tag{1}$$

$$I_i = K_1 \frac{v^2}{s} = K_1 a \tag{2}$$

In Equation (1), the term $Y_i$ is the output of the position transducer 41 (FIG. 5) during the present sample time, the term $FF_i$ is the feedforward correction used at the present sample time, the term $Y_{i-n}$ is the output of the position transducer 41, n sample times ago, and $YREF_i$ is the output 43 of the loop position reference generator 30. $K_1$ is a gain constant. Thus the numerator of Equation (1) represents the rate of change, or velocity, v, squared; while the denominator is the distance, s, that the tape must still travel, as indicated in Equation (2). Note that Equation (2) is the equation for constant acceleration, a.

The algorithm used by the linear algorithm generator 32 is as described below in Equation (3). The terms $Y_i$ and $Y_{i-n}$ are the same as in Equation (1), while $YREF_i$ is the output 42 of the loop position reference generator 30. The current is thus proportional to the distance left for the tape to go, s, and the velocity, v, as shown in Equation (4). $K_2$ and $K_3$ are gain constants. Equation (4) thus describes linear position as a function of velocity and distance.

$$I_i = K_2(YREF_i - Y_i) + K_3(Y_i - Y_{i-n}) \tag{3}$$

$$I_i = K_2(s) + K_3(v) \tag{4}$$

A unique feature of the present invention is its ability to selectively use one of the two algorithms, Equations (1) or (3), in controlling the reel motor, i.e., two mode control. The selector 33 (FIG. 5) selects which output signal, 31a or 31b, and hence which algorithm, is to be used. The nonlinear algorithm is used only when the polarity of v and s are the same and when the magnitude of s exceeds a prescribed amount. When the distance left for the tape to travel is below the prescribed amount, the linear algorithm is used. Thus, the invention conserves power by using the constant acceleration mode only until the error is reduced to a specified amount, and then switches over to the linear mode which will smoothly bring the error to zero with no overshoot.

As explained previously, the input signal 43 to the nonlinear generator 32 (FIG. 5) has a short time constant associated therewith. The use of a short time constant in this mode of operation maximizes the distance, s, which tends to minimize the current, and therefore the reel acceleration during the initial acceleration of the reel motor 37. In contrast, the linear algorithm of Equation (3) calls for minimum current for small position errors. A longer time constant is therefore used in connection with the input signal 42 delivered to the linear position reference generator 31 in order to smoothly stop the reel motor 37 using minimum current. This feature is further explained in connection with the description of FIG. 7 below.

The use of a feedforward signal 34a, generated by the feedforward generator 34, is another unique feature of the present invention. Examination of the velocity term in Equation (1) shows that the velocity will either be zero or very small when capstan motion is started or when the direction is changed. This is because the present sampled tape position is equal to, or nearly equal to, the past sampled tape position since the tape was, in general, at equilibrium when the capstan started. An initial delay in the movement of the tape in the buffer columns 28 and 31 (FIG. 1) is also caused by the tape in the "stubby" columns 29 and 30. Thus, the current initially determined by Equation (1) would be small, and since the position is sensed by a plurality of holes along the length of the column, a relatively long delay could occur before the velocity term becomes meaningful. The present invention overcomes this defect by adding the feedforward signal to the relatively small signal otherwise used in Equation (1) for several sampling times at the start of a tape movement controlled by the nonlinear algorithm generator. The feedforward signal thus speeds up the initial movement of the reel until the velocity term gains some significance.

Figure 6:
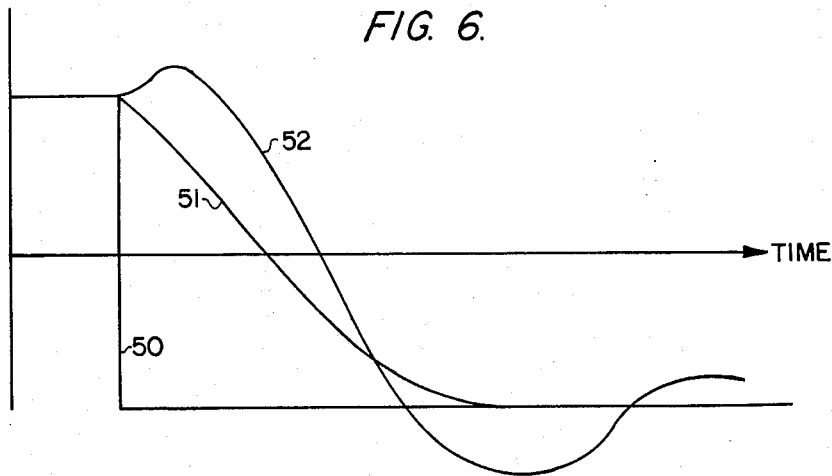
FIG. 6 is a time versus velocity graph comparing the response of the present invention to that of a controller of the prior art for a worst case capstan reversal.

FIG. 6 is a time versus velocity plot showing how the present invention and the prior art would respond to a worst case capstan reversal on a low speed system. Curve 50 shows the capstan velocity being instantaneously changed in direction (a step function). Curve 51 shows the resultant velocity curve of one of the reel motors using the two mode control of the present invention. The output 32a of the nonlinear algorithm generator 32 is selected by the selector 33 (FIG. 5) to control the current delivered to the reel motor 37 when the capstan reversal is sensed since v and s have the same polarity and s is large. As explained previously, the nonlinear algorithm results in constant acceleration. Since velocity is the integral of acceleration, the curve 51 is initially a ramp function. As the curve 51 approaches the final value of the curve 50, i.e., when s becomes small enough, the selector 33 selects the output 31a of the linear algorithm generator 31 to control the current to the reel motor. As a result, the curve 51 phases smoothly into the curve 50 with no overshoot.

In contrast, curve 52 of FIG. 6 represents the typical velocity curve of a reel motor controller of the prior art. This prior art response shows an initial increase in velocity because when, for example, the capstan direction is changed from that shown in FIG. 3b to that of FIG. 4b, the initial response of the controller is to increase the velocity of the reel supplying column 28 to bring the tape to the LO position shown in FIG. 4b. Thus, for a short period of time, column 28 is being fed by both the capstan and the reel. This period is followed by a period of rapid velocity change as a large current is applied to the reel motor to decelerate it and change its direction. Since only one mode of control is used, the curve 52 overshoots the final value of the curve 50. This requires a braking current to be used, resulting in a waste of power. In contrast, through use of the present invention, the reel motor is able to reach its final velocity without overshoot and without expending unneeded power braking the motor. Also, by using a constant current during the initial phase of movement, a lower peak current is required. A lower peak current means a lower peak torque, which in turn reduces the stress in the reel hub and tape pack.

As explained previously, if the tape speed is large enough, neither the prior art nor the present invention can handle a worst case capstan reversal. The prior art system will delay the capstan motion, using a fixed time delay, until it is safe to perform a capstan reversal. The present invention, in contrast, uses a unique feature to shorten this delay, thus lessening any degradation of performance. That is, capstan motion is prevented only until a determination has been made that the tape is close enough to the positions shown in FIGS. 3a and 4a. When the tape is close enough, capstan motion is started. This determination is made by calculating how much current the non-linear algorithm of Equation (1) would require if the capstan 21 were allowed to start. Only when that current is within the capability of the amplifier 36 is the capstan allowed to start.

The stubby columns 29 and 30 (FIG. 1) add a mechanical resonance to the position of the tape in the file column 28 and the machine column 31. When the capstan 21 starts to move tape forward after a long period at rest, the tape loop in stubby column 29 moves upward. The tape on the other side of stubby column 29, that which passes over pulley 14, does not move until the tape loop in stubby column 29 has moved upward slightly, enough to increase tape tension at that point. The stubby column 29 and the short length of tape between stubby column 29 and main buffer column 28 thus act as a spring-mass system which causes the tape loop in columns 29 and 30 to oscillate slightly. The frequency of this oscillation or resonance is determined by the stubby column shape, the tape tension, and the tape mass between the columns 28 and 29. The same sort of oscillation occurs on the other side of the capstan 21 in columns 30 and 31, at a frequency that is likewise determined by the stubby column shape and tape mass between columns. In one embodiment, the stubby column 30 on the machine reel side causes such a resonance at 50 Hz, while the stubby column 29 on the file reel side causes a resonance of 35 Hz. This oscillation can affect the tape position measurement s, and thereby the velocity v, which is calculated as the difference in two position measurements. The present invention masks the effect of this resonance by taking the difference in tape position one full resonance cycle apart. This concept is illustrated in FIGS. 7a and 7b, where the horizontal scale represents the sampling times, (e.g., ten milliseconds) and the vertical scale represents the position s.

Figure 7A:
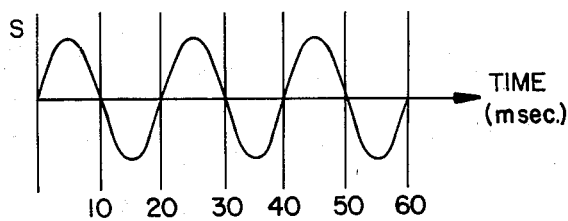
FIGS. 7a and 7b are tape displacement versus time plots illustrating how the present invention samples the position of the tape in the vacuum columns to mask the effects of mechanical resonance.
Figure 7B:
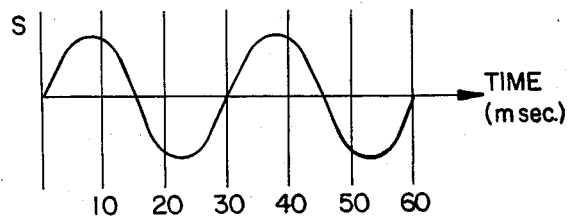

FIG. 7a shows the 50 Hz oscillation of the tape in the machine column while FIG. 7b shows the 35 Hz oscillation in the file column. The present invention sets "n" in Equations (1) and (3) to two for the machine column and to three for the file column. Thus, the tape position is always measured at the same relative point (or phase) on the resonance cycle (FIG. 7), although not necessarily at the zero crossing point.

Figure 8:
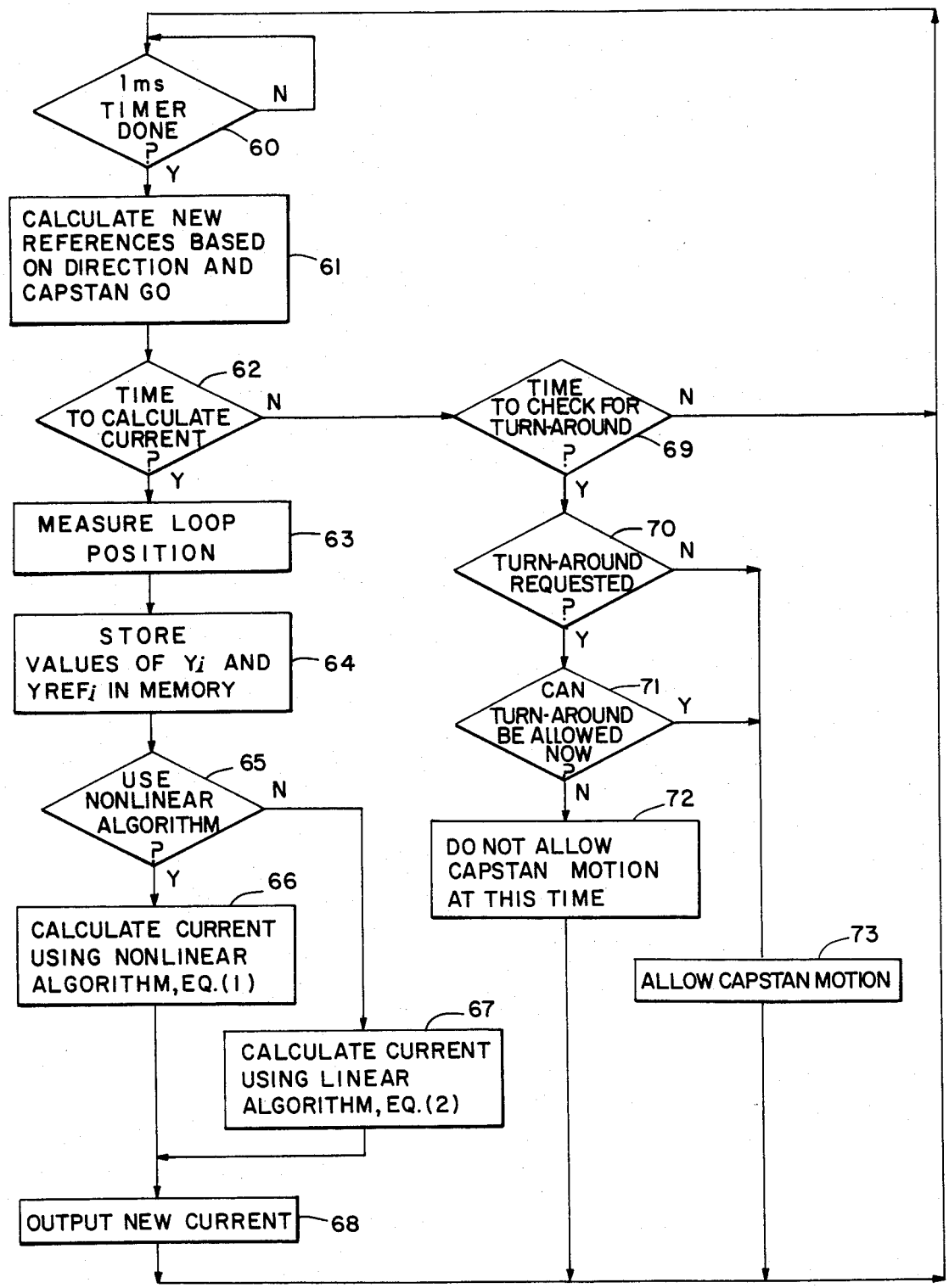
FIG. 8 is a flow chart illustrating the process used by the present invention to control the motion of the reel motors.

FIG. 8 is a flow chart showing the proceedure used by the present invention to control a reel motor. If a microprocessor is used, FIG. 8 thus represents the flow chart of the program(s) that one skilled in the art could readily write and store in the microprocessor for carrying out the invention. In a starting block 60, a check is made to see if a basic time unit has passed. In the preferred embodiment, one millisecond is used as the basic time unit. If the answer is yes, new reference value signals 42 and 43 (FIG. 5) are calculated in block 61. As explained previously, the reference values are generated at an exponential rate. They are recalculated every 20 millisecond based upon the condition of the CAPSTAN GO and DIRECTION signals.

In block 62 of FIG. 8, a check is made to see if it is time to calculate a new value for the reel motor current. In the preferred embodiment, this calculation is done periodically, such as every eight or ten milliseconds. If a new reel motor current value is required, the tape loop position is measured in block 63 (using the position transducer 41 in FIG. 5), and the newest values of the position ($Y_i$) and reference values ($YREF_i$) are stored in memory in block 64.

A check is made in block 65 to see if the nonlinear algorithm, Equation (1), should be used to calculate the current. Equation (1) is used if the polarity of v and s are the same and the magnitude of s exceeds a prescribed value. Depending upon the answer, a new current is calculated in block 66 or block 67 using the appropriate values of $YREF_i$, $Y_i$, $FF_i$ $Y_{i-n}$ from memory. The new value of current is sent to the motor in block 68 and control is returned to block 60 for the next millisecond to end.

If the answer at block 62 is no, (that is if it is not time to calculate a new value for the reel motor current), a check is made in block 69 to see if it is time to check for capstan reversal. In the preferred embodiment, this is done periodically, such as every eight or ten milliseconds. If the answer is no, control returns to block 60 for the next millisecond to end. If the answer is yes, the check for turn around is made in block 70. If no turn around has been requested, the present motion of the capstan is allowed in block 73. If a turn around has been requested, a check is made in block 71 to see if the turn around can be permitted now, i.e., is the tape positioned within the columns such that the capstan can be permitted to reverse directions without exceeding the capacity of the buffer columns to supply or store tape. Depending upon the answer, capstan motion is either allowed, in block 73, or disallowed in block 72.

As thus described, the two mode control system continuously rotates through the flow chart of FIG. 8. The reference values are continuously calculated; the correct algorithm is selected, switching between the two as necessary; and capstan reversals are held off until the tape is in the correct position in the columns. All the parameters used in the process are either easily measured or readily modified to meet the specific requirements of the particular tape system on which the invention is to be used.

What is claimed is:

1. A system for controlling a reel motor in a reel-to-reel tape system in which tape is moved from a first reel to a second reel through at least one tape buffer, said system comprising:
   a loop position reference generator that generates two loop reference signals, a first loop reference signal and a second loop reference signal, said first loop reference signal being coupled to a first of a plurality of current generators, and said second loop reference signal being coupled to a second of said plurality of current generators, said reference signals representing a desired position of said tape in said buffer;
   position transducer means for measuring the position of said tape in said buffer and generating a position signal, said position signal representing the measured position of said tape in said buffer;
   said plurality of current generators each producing an output control signal in response to one of said reference signals and said position signal;
   selector means for selecting the output control signal from one of said current generators in response to the measured position of said tape in said buffer relative to the desired position of said tape in said buffer, said selector means selecting the output control signal from said first current generator whenever there is a large error between the measured and desired tape position in said buffer, and selecting the output control signal from said second current generator whenever there is a small error between the measured and desired tape position; and
   drive means for driving said reel motor in response to said selected output control signal.

2. A system as defined in claim 1 wherein said loop position reference generator generates two loop reference signals, a first loop reference signal and a second loop reference signal, said first loop reference signal being coupled to a first of said plurality of current generators, and said second loop reference signal being coupled to a second of said plurality of current generators, and further wherein said selector means selects the output control signal from said first current generator whenever there is a large error between the measured and desired tape position in said buffer, and wherein said selector means selects the output control signal from said second current generator whenever there is a small error between the measured and desired tape position.

3. A system as defined in claim 1 further including a feedforward signal generator for generating a feedforward signal that is added to said position signal prior to presenting said position signal to said first current generator.

4. A system as defined in claim 3 wherein said first and second loop reference signals each have an exponential rate associated therewith, the exponential rate of said first loop reference signal being shorter than the exponential rate of said second loop reference signal.

5. A system as defined in claim 4 wherein the output control signal of said first current generator is determined from a non-linear equation that includes said combined position signal and feedforward signal and said first loop reference signal.

6. A system as defined in claim 5 wherein said nonlinear equation causes the output control signal of said first current generator to assume a constant value, which constant value control signal causes said drive means to deliver a constant current to said reel motor, whereby said constant current causes a constant acceleration of said reel motor, which constant acceleration moves said tape toward the desired position in said buffer with a minimum amount of power.

7. A system as defined in claim 5 wherein the output control signal of said second current generator is determined from a linear equation that includes said position signal and said second loop reference signal.

8. A control system as defined in claim 7 wherein said linear equation, causes the output control signal of said second current generator to assume a value proportional to the velocity of said tape and the distance said tape has left to travel in said buffer.

9. A control system as defined in claim 3 wherein said loop position reference generator, first and second current generators, and selector means are realized with a microprocessor.

10. A control system as defined in claim 9 wherein said loop reference signals, position signal, and feed forward signal comprise sampled time signals that take on discrete values at set times, and wherein said discrete signals are stored within a memory associated with said microprocessor for selective retrieval therefrom, and further wherein said microprocessor calculates said output control signals based on a predefined relationship between said discrete signals.

11. A control system as defined in claim 3 further including means for measuring the tape position within said buffer at the same relative point or phase of an oscillation that occurs in said tape position, thereby minimizing the effect that said oscillation has on the accuracy and repeatability of said tape position measurement.

12. A control system as defined in claim 11 further including means for maintaining a supply of tape in said buffer at all times, including when said tape system makes a complete reversal in tape direction.

13. A control system as defined in claim 12 wherein said means for maintaining a supply of tape in said buffer comprises means for delaying the movement of said tape from the first reel to the second reel, or vice versa, until said reel motor has had time to complete its reversal without exceeding the storage capacity of said tape buffer.

14. A method of controlling tape position in a tape buffer of a reel to reel tape system, said system including a capstan for moving the tape from a first reel through said tape buffer to a second reel, and first and second reel motors coupled to said first and second reels, said method comprising the steps of:
 (a) generating a tape position signal representative of the position of said tape within said tape buffer;
 (b) generating first and second tape reference signals, each of which represents a desired position of said tape within said tape buffer, and each of which has a different decay rate associated therewith;
 (c) generating a first control signal as a function of said tape position signal and said first tape reference signal;
 (d) generating a second control signal as a function of said tape position signal and said second tape reference signal;
 (e) selecting one of said first or second control signals, said first control signal being selected when a large error exists between the actual and desired tape positions in said buffer, and said second control signal being selected when a small error exists between the actual and desired tape positions in said buffer;
 (f) controlling said reel motor with said selected control signal so that the desired tape position within said buffer is achieved with minimum power consumption and without overshoot.

15. The method as defined in claim 14 wherein said first control signal is further a function of a feedforward signal generated by a feedforward signal generator, said feedforward signal being adapted to compensate for start-up delays associated with the operation of a tape position transducer used to measure the position of said tape within said buffer.

16. The method as defined in claim 15 wherein said first control signal causes said reel motor to accelerate at a constant rate, and further wherein said second control signal causes said reel motor to move at a rate proportional to the velocity of said tape and the distance said tape has left to move in said buffer.

* * * * *